(12) United States Patent
Biscondi et al.

(10) Patent No.: US 11,210,090 B2
(45) Date of Patent: Dec. 28, 2021

(54) REGISTER-BASED COMPLEX NUMBER PROCESSING

(71) Applicant: ARM LIMITED, Cambridge (GB)

(72) Inventors: Eric Biscondi, Roquefort les Pins (FR); Mbou Eyole, Soham (GB)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 16/630,614

(22) PCT Filed: Jul. 2, 2018

(86) PCT No.: PCT/GB2018/051851
§ 371 (c)(1),
(2) Date: Jan. 13, 2020

(87) PCT Pub. No.: WO2019/016507
PCT Pub. Date: Jan. 24, 2019

(65) Prior Publication Data
US 2021/0026628 A1     Jan. 28, 2021

(30) Foreign Application Priority Data

Jul. 20, 2017   (GB) ..................................... 1711700

(51) Int. Cl.
*G06F 9/30*      (2018.01)
(52) U.S. Cl.
CPC ........ *G06F 9/30036* (2013.01); *G06F 9/3001* (2013.01); *G06F 9/3012* (2013.01); *G06F 9/30109* (2013.01); *G06F 9/30145* (2013.01)
(58) Field of Classification Search
CPC ............. G06F 9/30036; G06F 9/30109; G06F 9/3012; G06F 9/3001; G06F 9/30145; G06F 9/30032; G06F 7/4812
See application file for complete search history.

(56) References Cited

U.S. PATENT DOCUMENTS

| | | | | |
|---|---|---|---|---|
| 7,219,212 | B1 * | 5/2007 | Sanghavi | ............ G06F 9/30021 712/225 |
| 2005/0125624 | A1 * | 6/2005 | Rose | ................... G06F 9/30112 711/201 |

(Continued)

FOREIGN PATENT DOCUMENTS

| CN | 101825998 | 9/2010 |
|---|---|---|
| GB | 2 409 059 | 6/2005 |

(Continued)

OTHER PUBLICATIONS

Combined Search and Examination Report for GB Application No. 1711700.3 dated Jan. 5, 2018, 8 pages.

(Continued)

*Primary Examiner* — Farley Abad
(74) *Attorney, Agent, or Firm* — Nixon & Vanderhye P.C.

(57) ABSTRACT

Apparatuses, methods, programs, and complex number processing instructions are provided to support vector processing operations on input data vectors comprising a plurality of input data items at respective positions in the input data vectors. In response to the instructions at least one first set of data items is extracted from alternating positions in a first source register and at least one second set of data items is extracted from alternating positions in the second source register, wherein consecutive data items in the first and second source registers comprise alternating real and imaginary components of respective sets of complex numbers. A result set of complex number components is generated using the two sets of data items as operands, and the result set of complex number components is one of a real part and an imaginary part of a complex number result of the complex number operation applied to the two sets of complex numbers. The result set of complex number components is applied to the destination register.

14 Claims, 14 Drawing Sheets

(56) References Cited

U.S. PATENT DOCUMENTS

| | | | |
|---|---|---|---|
| 2005/0193185 A1* | 9/2005 | Taunton | G06F 7/4806 |
| | | | 712/22 |
| 2009/0055455 A1 | 2/2009 | Matsuyama et al. | |
| 2010/0106944 A1* | 4/2010 | Symes | G06F 9/30043 |
| | | | 712/208 |
| 2012/0166511 A1 | 6/2012 | Hiremath et al. | |
| 2012/0173600 A1 | 7/2012 | Park et al. | |
| 2015/0143086 A1 | 5/2015 | Khan | |
| 2018/0095758 A1* | 4/2018 | Dubtsov | G06F 9/30036 |

FOREIGN PATENT DOCUMENTS

| | | |
|---|---|---|
| GB | 2548908 | 10/2017 |
| WO | 2017/112185 | 6/2017 |
| WO | 2019/016507 | 1/2019 |

OTHER PUBLICATIONS

Examination Report for GB Application No. 1711700.3 dated Aug. 29, 2019, 3 pages.
International Search Report and Written Opinion of the ISA for PCT/GB2018/051851 dated Oct. 4, 2018, 16 pages.
Office Action for EP Application No. 18739623.9 dated Jun. 15, 2021, 10 pages.

* cited by examiner

| Zn | d.im | d.re | c.im | c.re | b.im | b.re | a.im | a.re |
|----|------|------|------|------|------|------|------|------|

| Zm | h.im | h.re | g.im | g.re | f.im | f.re | e.im | e.re |
|----|------|------|------|------|------|------|------|------|

| Zda | result3.re | result2.re | result1.re | result0.re |
|-----|------------|------------|------------|------------|
|     | acc3.re+=  | acc2.re+=  | acc1.re+=  | acc0.re+=  |
|     | d.re*h.re  | c.re*g.re  | b.re*f.re  | a.re*e.re  |

Signed Multiply Add Long Bottom Bottom
SQDMLALB <Zda>.<T>, <Zn>.<Tb>, <Zm>.<Tb>

| Zn | d.im | d.re | c.im | c.re | b.im | b.re | a.im | a.re |
|----|------|------|------|------|------|------|------|------|

| Zm | h.im | h.re | g.im | g.re | f.im | f.re | e.im | e.re |
|----|------|------|------|------|------|------|------|------|

| Zda | result3.re | result2.re | result1.re | result0.re |
|-----|------------|------------|------------|------------|
|     | acc3.re-=  | acc2.re-=  | acc1.re-=  | acc0.re-=  |
|     | d.im*h.im  | c.im*g.im  | b.im*f.im  | a.im*e.im  |

Signed Multiply Subtract Long Top Top
SQDMLSLT <Zda>.<T>, <Zn>.<Tb>, <Zm>.<Tb>

| Zn | d.im | d.re | c.im | c.re | b.im | b.re | a.im | a.re |
|----|------|------|------|------|------|------|------|------|

| Zm | h.im | h.re | g.im | g.re | f.im | f.re | e.im | e.re |
|----|------|------|------|------|------|------|------|------|

| Zdb | result3.im | result2.im | result1.im | result0.im |
|-----|------------|------------|------------|------------|
|     | acc3.im+=  | acc2.im+=  | acc1.im+=  | acc0.im+=  |
|     | d.im*h.re  | c.im*g.re  | b.im*f.re  | a.im*e.re  |

Signed Multiply Add Long Top Bottom
SQDMLALTB <Zdb>.<T>, <Zn>.<Tb>, <Zm>.<Tb>

| Zm | h.im | h.re | g.im | g.re | f.im | f.re | e.im | e.re |
|----|------|------|------|------|------|------|------|------|

| Zn | d.im | d.re | c.im | c.re | b.im | b.re | a.im | a.re |
|----|------|------|------|------|------|------|------|------|

| Zdb | result3.im | result2.im | result1.im | result0.im |
|-----|------------|------------|------------|------------|
|     | acc3.im+=  | acc2.im+=  | acc1.im+=  | acc0.im+=  |
|     | d.re*h.im  | c.re*g.im  | b.re*f.im  | a.re*e.im  |

Signed Multiply Add Long Top Bottom
SQDMLALTB <Zdb>.<T>, <Zm>.<Tb>, <Zn>.<Tb>

FIG. 5

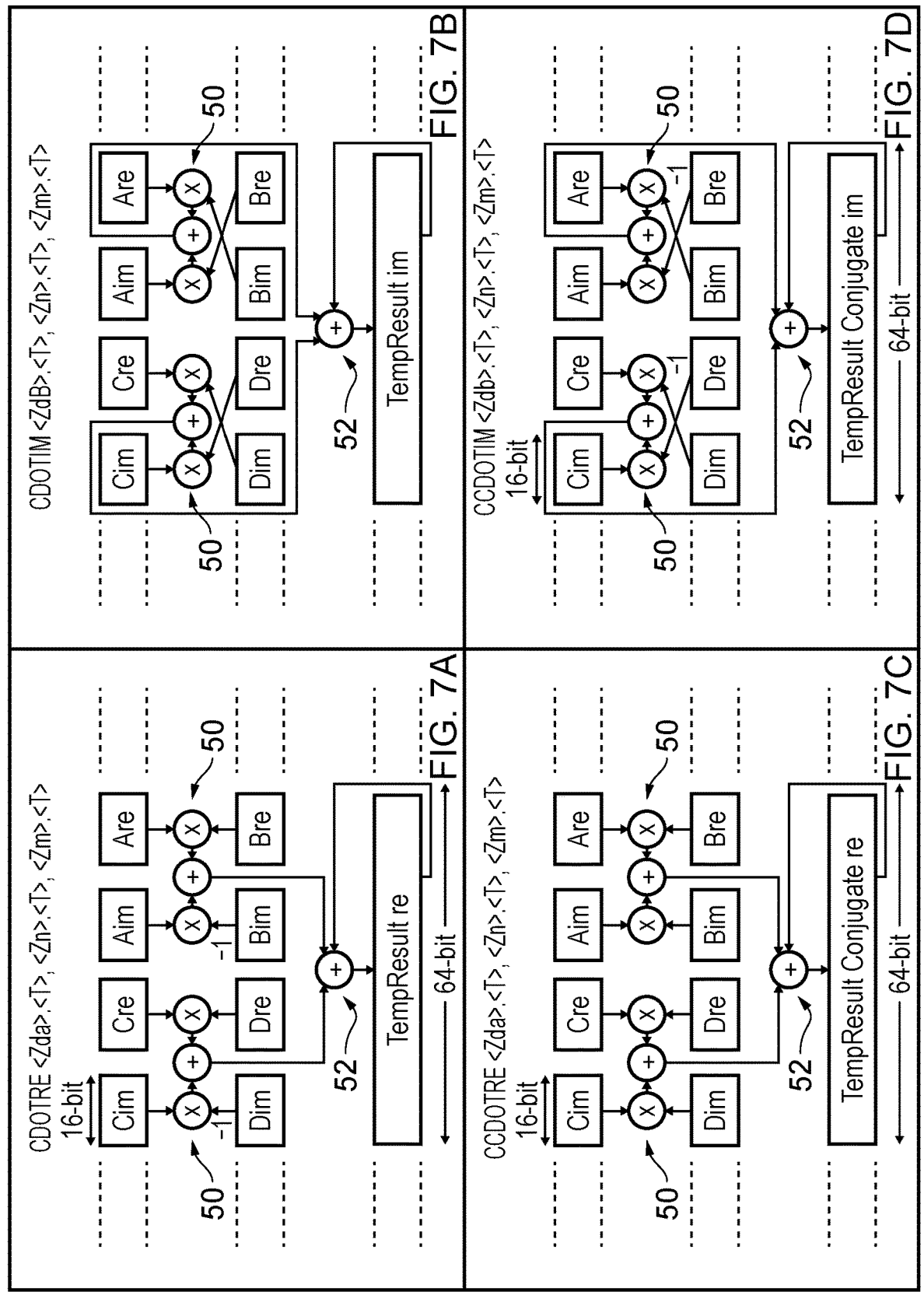

End of Loop:

| | result3.re | result2.re | result1.re | result0.re | Za |
| --- | --- | --- | --- | --- | --- |
| | result7.re | result6.re | result5.re | result4.re | Zb |
| | result3.im | result2.im | result1.im | result0.im | Zc |
| | result7.im | result6.im | result5.im | result4.im | Zd |
| | result3.re | result2.re | result1.re | | Ze |
| | result3.im | result2.im | result1.im | | Zf |
| result7.re | result6.re | result5.re | result4.re | result0.re | Ze |
| result7.im | result6.im | result5.im | result4.im | result0.im | Zf |
| r7.re | r3.re | r2.re | r1.re | | Zg |
| r7.im | r3.im | r2.im | r1.im | | Zg |

SQRSHRNB Ze.\<T\>, Za.\<Tb\>, #\<const\>
SQRSHRNB Zf.\<T\>, Zc.\<Tb\>, #\<const\>
SQRSHRNT Ze.\<T\>, Zb.\<Tb\>, #\<const\>
SQRSHRNT Zf.\<T\>, Zd.\<Tb\>, #\<const\>

SQRSHRNB Zg.\<T\>, Ze.\<Tb\>, #\<const\>
SQRSHRNT Zg.\<T\>, Zf.\<Tb\>, #\<const\>

| r7.im | r7.re | r6.im | r6.re | r5.im | r5.re | r4.im | r4.re | r3.im | r3.re | r2.im | r2.re | r1.im | r1.re | r0.im | r0.re |
| --- | --- | --- | --- | --- | --- | --- | --- | --- | --- | --- | --- | --- | --- | --- | --- |

REV
UZIP1

FIG. 8

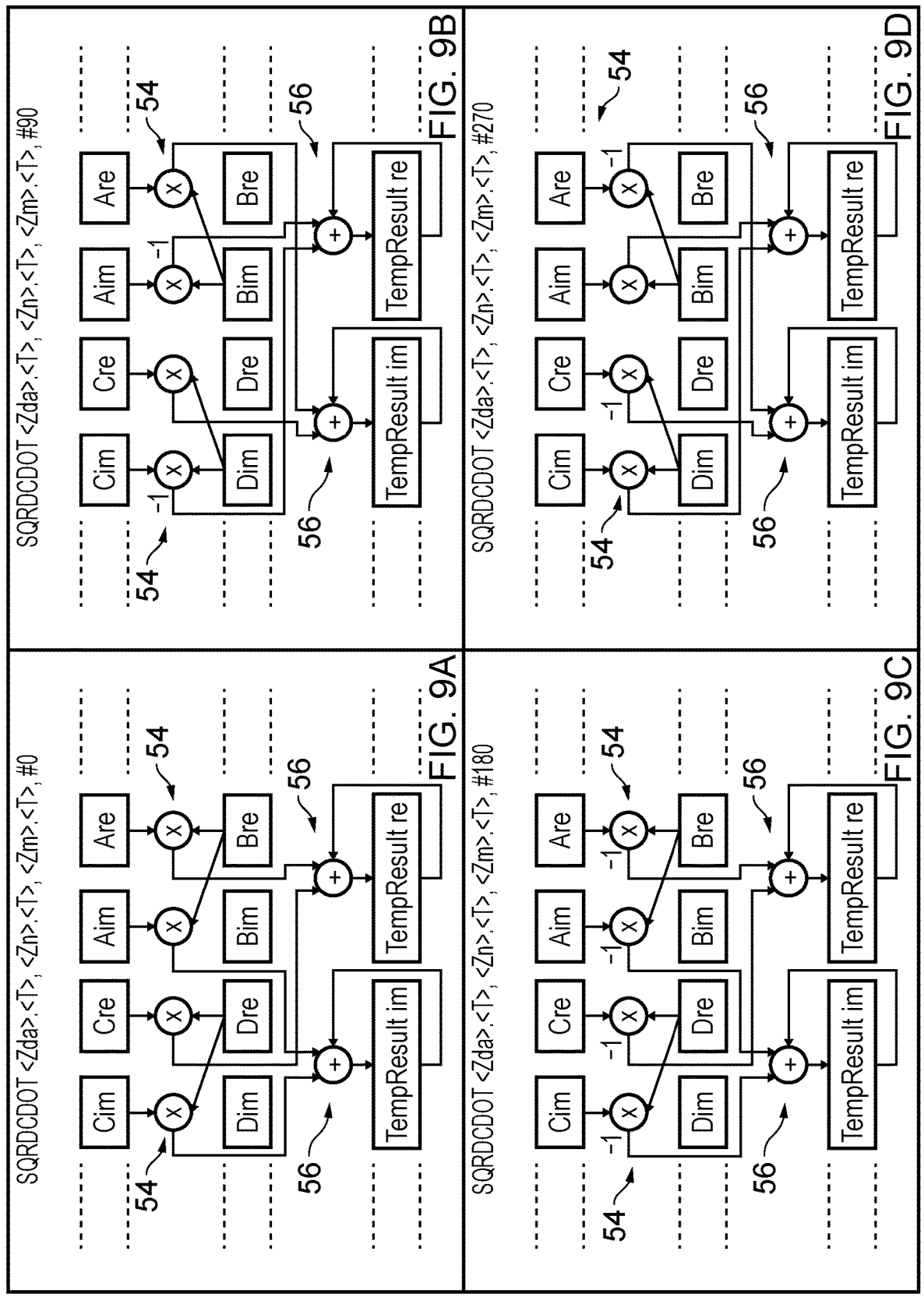

| | | | | | | | |
|---|---|---|---|---|---|---|---|
| result3.im | result3.re | result2.im | result2.re | result1.im | result1.re | result0.im | result0.re |

Ze

| | | | | | | | |
|---|---|---|---|---|---|---|---|
| result7.im | result7.re | result6.im | result6.re | result5.im | result5.re | result4.im | result4.re |

Zf

| | | | | | | | |
|---|---|---|---|---|---|---|---|
| | r3.im | | r3.re | | r2.im | | r2.re | | r1.im | | r1.re | | r0.im | | r0.re |

Zg

| | | | | | | | | | | | | | | | |
|---|---|---|---|---|---|---|---|---|---|---|---|---|---|---|---|
| r7.im | r7.re | r3.im | r3.re | r6.im | r6.re | r2.im | r2.re | r5.im | r5.re | r1.im | r1.re | r4.im | r4.re | r0.im | r0.re |

Zg

| | | | | | | | | | | | | | | | |
|---|---|---|---|---|---|---|---|---|---|---|---|---|---|---|---|
| r7.im | r7.re | r6.im | r6.re | r5.im | r5.re | r4.im | r4.re | r3.im | r3.re | r2.im | r2.re | r1.im | r1.re | r0.im | r0.re |

SQRSHRNB Zg.<T>, Ze.<Tb>, #<const>

SQRSHRNT Zg.<T>, Zf.<Tb>, #<const>

REV
UZIP1

FIG. 10

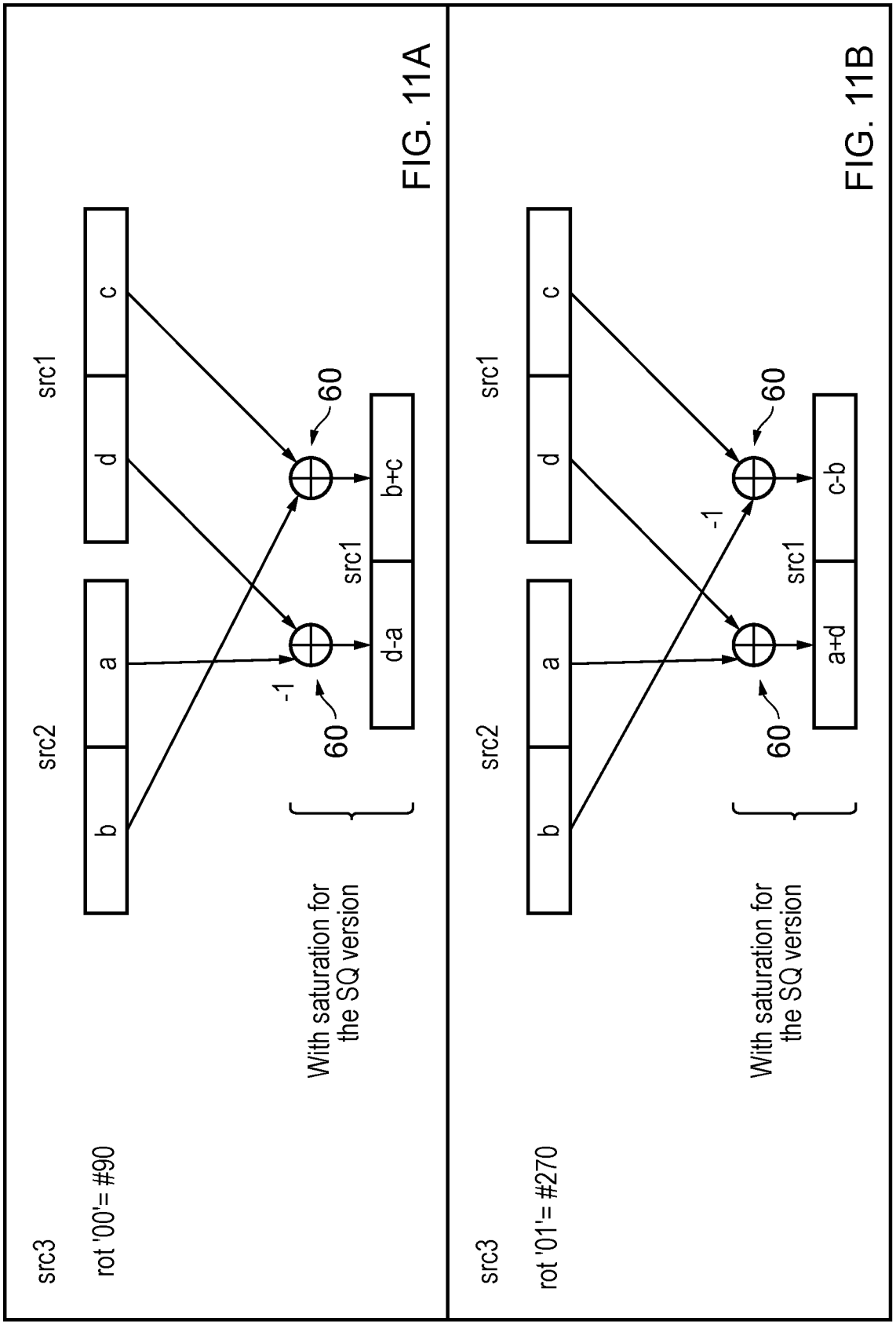

|  | Output | Imaginary | Real |
|---|---|---|---|
| #0 | Src1 | Re | Re |
|  | Src2 | Im | Re |
| #90 | Src1 | Im | Im |
|  | Src2 | Re | -Im |
| #180 | Src1 | Re | Re |
|  | Src2 | -Im | -Re |
| #270 | Src1 | Im | Im |
|  | Src2 | -Re | Im |

FIG. 12

REGISTER-BASED COMPLEX NUMBER PROCESSING

This application is the U.S. national phase of International Application No. PCT/GB2018/051851 filed Jul 2, 2018 which designated the U.S. and claims priority to GB Application No. 1711700.3 filed Jul. 20, 2017, the entire contents of each of which are hereby incorporated by reference.

The present disclosure relates to a data processing apparatus. More particularly it relates to performing complex number operations in a data processing apparatus.

A data processing apparatus may be required to perform complex number computations in a variety of contexts. Some data processing systems support the processing of vector instructions for which a source operand or result value specified by a vector processing instruction is a vector comprising multiple data items which are subjected, in parallel, to a specified data processing operation. The two-part structure of a complex number (i.e. its real and imaginary parts) means that providing a data processing system which can perform complex number operations in a vectorised manner is not trivial.

In one example embodiment there is an apparatus comprising: instruction decoder circuitry to decode instructions; and data processing circuitry to selectively apply vector processing operations specified by the instructions to input data vectors comprising a plurality of input data items at respective positions in the input data vectors, wherein the instruction decoder circuitry is responsive to a complex number processing instruction specifying a complex number operation, a first source register, a second source register, and a destination register to generate control signals to control the data processing circuitry to extract at least one first set of data items from alternating positions in the first source register, wherein consecutive data items in the first source register comprise alternating real and imaginary components of a first set of complex numbers; extract at least one second set of data items from alternating positions in the second source register, wherein consecutive data items in the second source register comprise alternating real and imaginary components of a second set of complex numbers; generate a result set of complex number components using the first and second sets of data items as operands, wherein the result set of complex number components is one of a real part and an imaginary part of the complex number operation applied to the first set of complex numbers and the second set of complex numbers; and apply the result set of complex number components to the destination register.

In another example embodiment there is a method of operating a data processing apparatus comprising the steps of: decoding instructions; selectively applying vector processing operations specified by the instructions to input data vectors comprising a plurality of input data items at respective positions in the input data vectors; generating control signals in response to a complex number processing instruction specifying a complex number operation, a first source register, a second source register, and a destination register to control data processing circuitry of the data processing apparatus to extract at least one first set of data items from alternating positions in the first source register, wherein consecutive data items in the first source register comprise alternating real and imaginary components of a first set of complex numbers; extract at least one second set of data items from alternating positions in the second source regis-ter, wherein consecutive data items in the second source register comprise alternating real and imaginary components of a second set of complex numbers; generate a result set of complex number components using the first and second sets of data items as operands, wherein the result set of complex number components is one of a real part and an imaginary part of a complex number result of the complex number operation applied to the first set of complex numbers and the second set of complex numbers; and apply the result set of complex number components to the destination register.

In another example embodiment there is an apparatus comprising: means for decoding instructions; means for selectively applying vector processing operations specified by the instructions to input data vectors comprising a plurality of input data items at respective positions in the input data vectors; means for generating control signals in response to a complex number processing instruction specifying a complex number operation, a first source register, a second source register, and a destination register to control means for data processing in the data processing apparatus to extract at least one first set of data items from alternating positions in the first source register, wherein consecutive data items in the first source register comprise alternating real and imaginary components of a first set of complex numbers; extract at least one second set of data items from alternating positions in the second source register, wherein consecutive data items in the second source register comprise alternating real and imaginary components of a second set of complex numbers; generate a result set of complex number components using the first and second sets of data items as operands, wherein the result set of complex number components is one of a real part and an imaginary part of a complex number result of the complex number operation applied to the first set of complex numbers and the second set of complex numbers; and apply the result set of complex number components to the destination register.

In another example embodiment there is a computer program for controlling a host data processing apparatus to provide an instruction execution environment comprising: instruction decoding program logic to decode instructions; and data processing program logic to selectively apply vector processing operations specified by the instructions to input data vector structures comprising a plurality of input data items at respective positions in the input data vector structures, wherein the instruction decoding program logic is responsive to a complex number processing instruction specifying a complex number operation, a first source data structure, a second source data structure, and a destination data structure to generate control signals to control the data processing program logic to extract at least one first set of data items from alternating positions in the first source data structure, wherein consecutive data items in the first source data structure comprise alternating real and imaginary components of a first set of complex numbers; extract at least one second set of data items from alternating positions in the second source data structure, wherein consecutive data items in the second source data structure comprise alternating real and imaginary components of a second set of complex numbers; generate a result set of complex number components using the first and second sets of data items as operands, wherein the result set of complex number components is one of a real part and an imaginary part of a complex number result of the complex number operation applied to the first set of complex numbers and the second set of complex numbers; and apply the result set of complex number components to the destination data structure.

The present techniques will be described further, by way of example only, with reference to embodiments thereof as illustrated in the accompanying drawings, in which:

FIG. 1 schematically illustrates a data processing apparatus in one embodiment;

FIG. 2 schematically illustrates data processing circuitry which performs a non-widening complex number operation in one embodiment;

FIG. 3 schematically illustrates data processing circuitry which performs a widening complex number operation in one embodiment;

FIG. 4 schematically illustrates data processing circuitry which precedes a complex number operation with a replication operation in one embodiment;

FIG. 5 illustrates the operation of data processing circuitry in embodiments which are responsive to four varieties of signed multiply complex number instruction;

Figure 13:
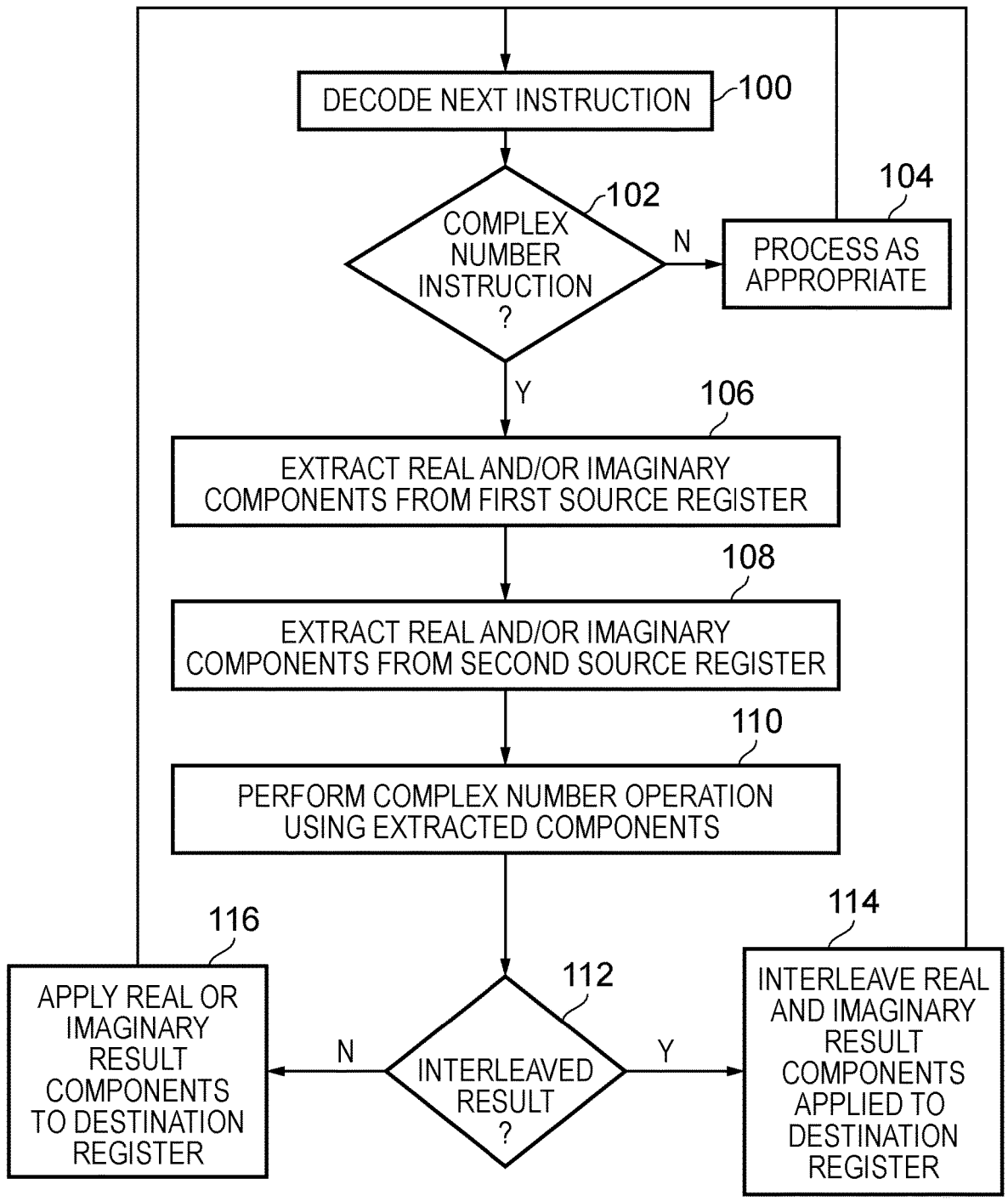
Figure 14:
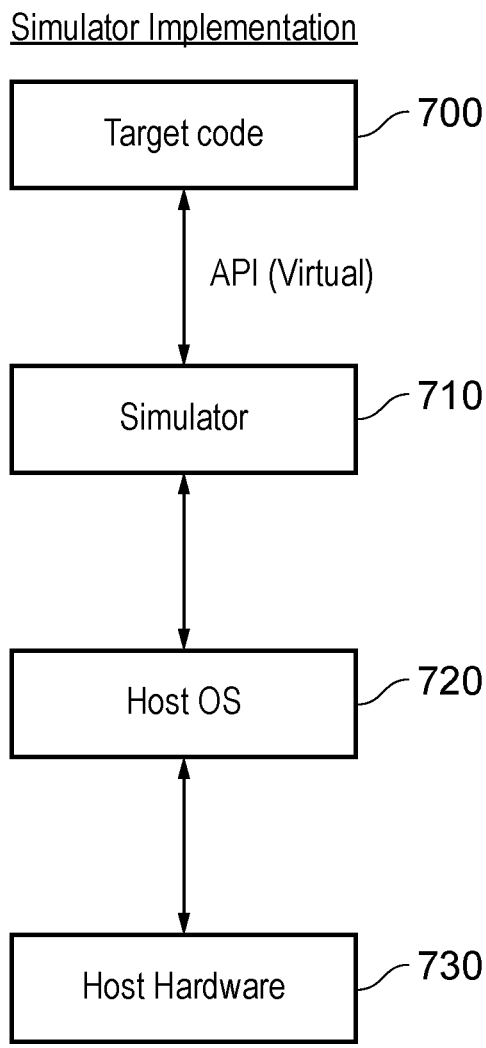

FIGS. 7A-7D schematically illustrate data processing circuitry responsive to four different types of complex dot product instruction in one embodiment;

FIG. 8 shows a sequence of operations which are carried out in one embodiment following the use of complex dot product instructions such as those illustrated in FIGS. 7A-7D to get back to the initial data precision;

FIGS. 9A-9D schematically illustrate data processing circuitry responsive to four different types of non-widening complex dot product instruction in one embodiment;

FIG. 10 shows a sequence of operations which is carried out in one embodiment in order to get back to the initial data precision following the execution of instructions such as those illustrated in FIGS. 9A-9D;

FIGS. 11A and 11B schematically illustrate data processing circuitry in one embodiment to support complex addition instructions, which further include a transposition parameter;

FIG. 12 shows a set of four transpositions which are carried out in response to four respective transposition parameters in one embodiment;

FIG. 13 shows a sequence of steps which are taken when carrying out the method of one embodiment; and FIG. 14 schematically illustrates the components of a system which provides a simulator implementation in one embodiment.

DESCRIPTION OF EMBODIMENTS

At least some embodiments provide an apparatus comprising: instruction decoder circuitry to decode instructions; and data processing circuitry to selectively apply vector processing operations specified by the instructions to input data vectors comprising a plurality of input data items at respective positions in the input data vectors, wherein the instruction decoder circuitry is responsive to a complex number processing instruction specifying a complex number operation, a first source register, a second source register, and a destination register to generate control signals to control the data processing circuitry to extract at least one first set of data items from alternating positions in the first source register, wherein consecutive data items in the first source register comprise alternating real and imaginary components of a first set of complex numbers; extract at least one second set of data items from alternating positions in the second source register, wherein consecutive data items in the second source register comprise alternating real and imaginary components of a second set of complex numbers; generate a result set of complex number components using the first and second sets of data items as operands, wherein the result set of complex number components is one of a real part and an imaginary part of a complex number result of the complex number operation applied to the first set of complex numbers and the second set of complex numbers; and apply the result set of complex number components to the destination register.

A contemporary data processing system may be required to perform complex number arithmetic computations in a variety of contexts, for example in digital communication, radar systems, and optical systems, to name but a diverse few. Further, a data processing system which is able to process data in a vectorised manner (i.e. to apply data processing operations specified by a single instruction in parallel to multiple data items within a data vector) can bring advantages in terms of throughput and processing efficiency. However, the application of vector processing techniques to complex number data is not trivial for a number of reasons. Firstly the inherent structure (real and imaginary components) of a complex number means that the data processing system must be configured to correctly handle these respective parts of each individual complex number data item within a larger set of data items in a vector and furthermore the vectorised nature of the input data adds further constraints to the manner in which the respective components of two sets of complex numbers can be brought together in a given complex number operation. The present techniques provide an approach in which the data processing circuitry extracts a set of data items from alternating positions in each of the source registers, that is to say where it is recognised that a source register holds a set of consecutive data items where those data items alternate between the real and imaginary components of a set of complex numbers and the real and imaginary components are paired to form the individual complex numbers. Accordingly, the data processing circuitry is therefore able to pull out, for example, the real components from a source register (although it should be noted that in other examples it could equally extract the imaginary components as an alternative or in addition). Thus the data processing circuitry can then apply the required complex number operation to the components extracted from the respective source registers to produce a result set complex number components, where the result set of complex number components is either a set of real components of the complex number results of the complex number operation or an imaginary part. Note that this does not preclude a further set of complex number components also being generated, i.e. both the real and the imaginary parts of a set of complex numbers can be generated, but in some embodiments only one or the other is generated. The result set of complex number components is then applied to the destination register specified in the complex number processing instruction, where this application may take a variety of forms. For example the result set may simply be stored in the destination register, or may be accumulated (by a variety of mathematical methods) with the existing content of the destination register.

As mentioned above the result set of complex number components can vary in dependence on the particular complex number processing instruction defined, but in some embodiments the result set of complex number components is a set of real components of the complex number result. Equally, in other embodiments the result set of complex number components is a set of imaginary components of the complex number result.

The result set of complex number components generated by the data processing circuitry in response to the complex number processing instruction may be applied to the destination register in a variety of ways, but in some embodiments the data processing circuitry is responsive to the control signals to apply the result set of complex number components in consecutive positions in the destination register. Accordingly, where the result set of complex number components is one of a real part and an imaginary part of a complex number result of the complex number operation, this means that the content of the destination register is then in a different format to the content of the first and second source registers, i.e. where the first and second source registers hold consecutive pairs of real and imaginary components of a set of complex numbers, the destination register then only holds either consecutive real components or consecutive imaginary components. This enables a large variety of complex number operations to be defined, yet for the result to still be able to be handled within a vector processing configuration.

Indeed in some such embodiments each complex number component of the result set of complex number components is wider than each data item of the first and second sets of data items. Accordingly, this widening of the components of the result set of complex number components means that the precision of the result set of complex number components is better preserved, despite operating within a vector processing environment, which might otherwise require significant truncation of the complex number components of the result set in order to fit them into their respective lanes of the vector processing. It should therefore be understood that the present techniques provide an approach in which, for example, the real and imaginary components of the result set of complex numbers can be determined by two separate instructions, with the opportunity to recombine these components into a consecutive set of real and imaginary complex number pairs thereafter.

Nevertheless, although in some embodiments mentioned above the data processing circuitry can apply the result set of complex number components into consecutive positions in the destination register, in some embodiments the data processing circuitry generates both a result set of complex number real components and the corresponding result set of complex number imaginary components and these can then be interleaved in their application to the destination register, such that consecutive real and imaginary component pairs, forming a consecutive set of complex numbers, thus results. Accordingly, in some embodiments the data processing circuitry is responsive to the control signals to apply the result set of complex number components in alternating positions in the destination register interleaved with a further result set of complex number components, wherein when the result set of complex number components is a set of real components of the complex number result the further result set of complex number components is a set of imaginary components of the complex number result, and wherein when the result set of complex number components is a set of imaginary components of the complex number result the further result set of complex number components is a set of real components of the complex number result.

The manner in which the data processing circuitry extracts the first set of data items and the second set of data items from their respective alternating positions in the first and second source registers may be variously defined, and indeed in some embodiments variously controlled, for example in some embodiments the complex number processing instruction further specifies whether the first set of data items is to be extracted from odd-numbered positions or even-numbered positions in the first source register, and wherein the complex number processing instruction further specifies whether the second set of data items is to be extracted from odd-numbered positions or even-numbered positions in the second source register. The "odd" and the "even" positions may also be referred to herein as "bottom" and "top" positions.

There may also be further data processing applied to at least one of the first source register and the second source register before the first and second set of data items are extracted in order to perform the complex number operation and in some embodiments the complex number processing instruction further specifies a replication index for at least one of the first source register and the second source register, and wherein the data processing circuitry is further responsive to the control signals to replicate a source set of complex numbers indicated by the replication index in the at least one of the first source register and the second source register. This "indexing" of at least one of the first and second source registers therefore enables the programmer to identify a subset of the data held in the respective register and this subset can then be reproduced so that the extraction of the first and second data set then uses this reproduced subset. For example, depending on the nature of the index defined, the replication index may specify one of two halves of predetermined portions of a vector register and the replication then causes that specified half to be copied into the other half in each predetermined portion. To take just one specific example, where the units of the vector register to which the replication index applies are 128 bits in length and the replication index specifies the upper half of this unit, and where the present techniques have made use of that 128-bit space to store four consecutive 32-bit complex number components (i.e. two 64-bit complex numbers), the replication will cause the identified 64-bit complex number to be replicated into the adjacent 64-bit space within that 128-bit unit. This operation is repeated across the full width of the vector register.

Although the above example is given of a single replication being performed, in some embodiments replication of the source set of complex numbers comprises more than single replication of the source set of complex numbers. For example, where the replication index specifies a quarter of a given unit of the vector, this quarter may be replicated three times in order to fill the full unit. Remaining with the above example of 128-bit units, but in an example in which the complex number components are each 16-bit, then this would cause an identified 32-bit complex number (16-bit real and 16-bit imaginary component) to be replicated into the other three 32-bit portions on this 128-bit unit. Such "indexing" may be applied to any of the instructions described herein.

Whilst in some embodiments only a single set of data items is extracted from the first source register, representing either the set of real components or the set of imaginary components of the set of complex numbers in the first source register, in some embodiments both the real and the imaginary components are extracted. Accordingly, in these embodiments the at least one first set of data items extracted from the first source register comprises the first set of data items and a third set of data items, wherein when the first set of data items is real components of the first set of complex numbers the third set of data items is imaginary components of the first set of complex numbers, and when the first set of data items is imaginary components of the first set of complex numbers the third set of data items is real components of the first set of complex numbers, and wherein the data processing circuitry is further responsive to the control signals to generate the result set of complex number components further using the third set of data items as operands. Thus, the data processing circuitry then has both the real and the imaginary components of the first set of complex numbers for involvement in the complex number operation, as appropriate to the particular complex number processing instruction (and therefore complex number operation) defined.

Equally in some embodiments the at least one second set of data items extracted from the second source register comprises the second set of data items and a fourth set of data items, wherein when the second set of data items is real components of the second set of complex numbers the fourth set of data items is imaginary components of the second set of complex numbers, and when the second set of data items is imaginary components of the second set of complex numbers the fourth set of data items is real components of the second set of complex numbers, and wherein the data processing circuitry is further responsive to the control signals to generate the result set of complex number components further using the fourth set of data items as operands.

The complex number operation may take a variety of forms, but in some embodiments the complex number operation is a complex dot product operation, and wherein the data processing circuitry comprises accumulation circuitry responsive to the control signals to accumulate the result set of complex number components from partial products of a set of pairs of real and imaginary component pairs of the first set of complex numbers and a set of pairs of real and imaginary component pairs of the second set of complex numbers. In some embodiments the complex number operation comprises a complex multiply operation. In some embodiments the complex number operation is a complex addition operation. In some embodiments the complex number operation is a complex subtraction operation.

The present techniques further provide that additional manipulation of the components of one or both of the first and second sets of complex numbers may be carried out prior to the complex number operation as this has been found to enable particularly efficient determination of a required complex number result, which could for example, otherwise require additional instructions to be executed in advance in order to manipulate the content of at least one of the first and second source register. Hence some embodiments provide that the complex number processing instruction further specifies a transposition parameter, and the data processing circuitry is responsive to the control signals to apply a transposition operation on at least one of the first and second sets of complex numbers prior to application of the complex number operation to the first and second sets of complex numbers.

This transposition operation applied to at least one of the first and second sets of complex numbers may be variously defined. It may be referred to as a "rotation", and indeed in some instances may correspond to a rotation of the complex numbers represented in the complex plane around the origin, although the present techniques are not limited to transpositions which correspond to such "true" rotations and in some embodiments the transposition operation comprises at least one of: substitution of real with imaginary components; substitution of imaginary with real components; exchange of real and imaginary components; negation of real components; and negation of imaginary components in at least one the first set of complex numbers and the second set of complex numbers.

The transposition parameter may be provided in a variety of ways, but in some embodiments the complex number processing instruction specifies the transposition parameter as an immediate value. Although, as mentioned above, the transposition does not always directly correspond to a true rotation in the complex plane, nevertheless, the transposition parameter is sometimes referred to herein as a "rotation value", and in some embodiments may take one of a set of four values which, by analogy with the complex plane rotation example, may be labelled 0, 90, 180, and 270, in reference to degrees of rotation for quarter-turn rotations in the complex plane.

As mentioned above, the result set of complex number components may be applied to the destination register in a variety of ways, but in some embodiments applying the result set of complex number components to the destination register comprises storing the result set of complex number components in the destination register. In other embodiments applying the result set of complex number components to the destination register comprises accumulating the result set of complex number components with content of the destination register.

Whilst the destination register may be specified as a distinct register from both the first and the second source registers, in some embodiments a "destructive" operation may be defined in which the destination register is one of the first source register and the second source register.

The manner in which the data processing circuitry handles the situation in which a result value becomes too large for the storage defined to hold that value may take a variety of forms. For example the value may wrap around (i.e. beyond a maximum value return to 0), whilst in some embodiments the complex number operation is a saturating operation (i.e. in other words, beyond a maximum value the result is held at that maximum value).

At least some embodiments provide a method of operating a data processing apparatus comprising the steps of: decoding instructions; selectively applying vector processing operations specified by the instructions to input data vectors comprising a plurality of input data items at respective positions in the input data vectors; generating control signals in response to a complex number processing instruction specifying a complex number operation, a first source register, a second source register, and a destination register to control data processing circuitry of the data processing apparatus to extract at least one first set of data items from alternating positions in the first source register, wherein consecutive data items in the first source register comprise alternating real and imaginary components of a first set of complex numbers; extract at least one second set of data items from alternating positions in the second source register, wherein consecutive data items in the second source register comprise alternating real and imaginary components of a second set of complex numbers; generate a result set of complex number components using the first and second sets of data items as operands, wherein the result set of complex number components is one of a real part and an imaginary part of a complex number result of the complex number operation applied to the first set of complex numbers and the second set of complex numbers; and apply the result set of complex number components to the destination register.

At least some embodiments provide an apparatus comprising: means for decoding instructions; means for selectively applying vector processing operations specified by the instructions to input data vectors comprising a plurality of input data items at respective positions in the input data vectors; means for generating control signals in response to a complex number processing instruction specifying a complex number operation, a first source register, a second source register, and a destination register to control means for data processing in the data processing apparatus to extract at least one first set of data items from alternating positions in the first source register, wherein consecutive data items in the first source register comprise alternating real and imaginary components of a first set of complex numbers; extract at least one second set of data items from alternating positions in the second source register, wherein consecutive data items in the second source register comprise alternating real and imaginary components of a second set of complex numbers; generate a result set of complex number components using the first and second sets of data items as operands, wherein the result set of complex number components is one of a real part and an imaginary part of a complex number result of the complex number operation applied to the first set of complex numbers and the second set of complex numbers; and apply the result set of complex number components to the destination register.

At least some embodiments provide a computer program for controlling a host data processing apparatus to provide an instruction execution environment comprising: instruction decoding program logic to decode instructions; and data processing program logic to selectively apply vector processing operations specified by the instructions to input data vector structures comprising a plurality of input data items at respective positions in the input data vector structures, wherein the instruction decoding program logic is responsive to a complex number processing instruction specifying a complex number operation, a first source data structure, a second source data structure, and a destination data structure to generate control signals to control the data processing program logic to extract at least one first set of data items from alternating positions in the first source data structure, wherein consecutive data items in the first source data structure comprise alternating real and imaginary components of a first set of complex numbers; extract at least one second set of data items from alternating positions in the second source data structure, wherein consecutive data items in the second source data structure comprise alternating real and imaginary components of a second set of complex numbers; generate a result set of complex number components using the first and second sets of data items as operands, wherein the result set of complex number components is one of a real part and an imaginary part of a complex number result of the complex number operation applied to the first set of complex numbers and the second set of complex numbers; and apply the result set of complex number components to the destination data structure.

At least some embodiments provide a computer-readable storage medium storing in a non-transient fashion the computer program according to the computer program embodiments mentioned above.

Some particular embodiments are now described with reference to the figures.

Figure 1:
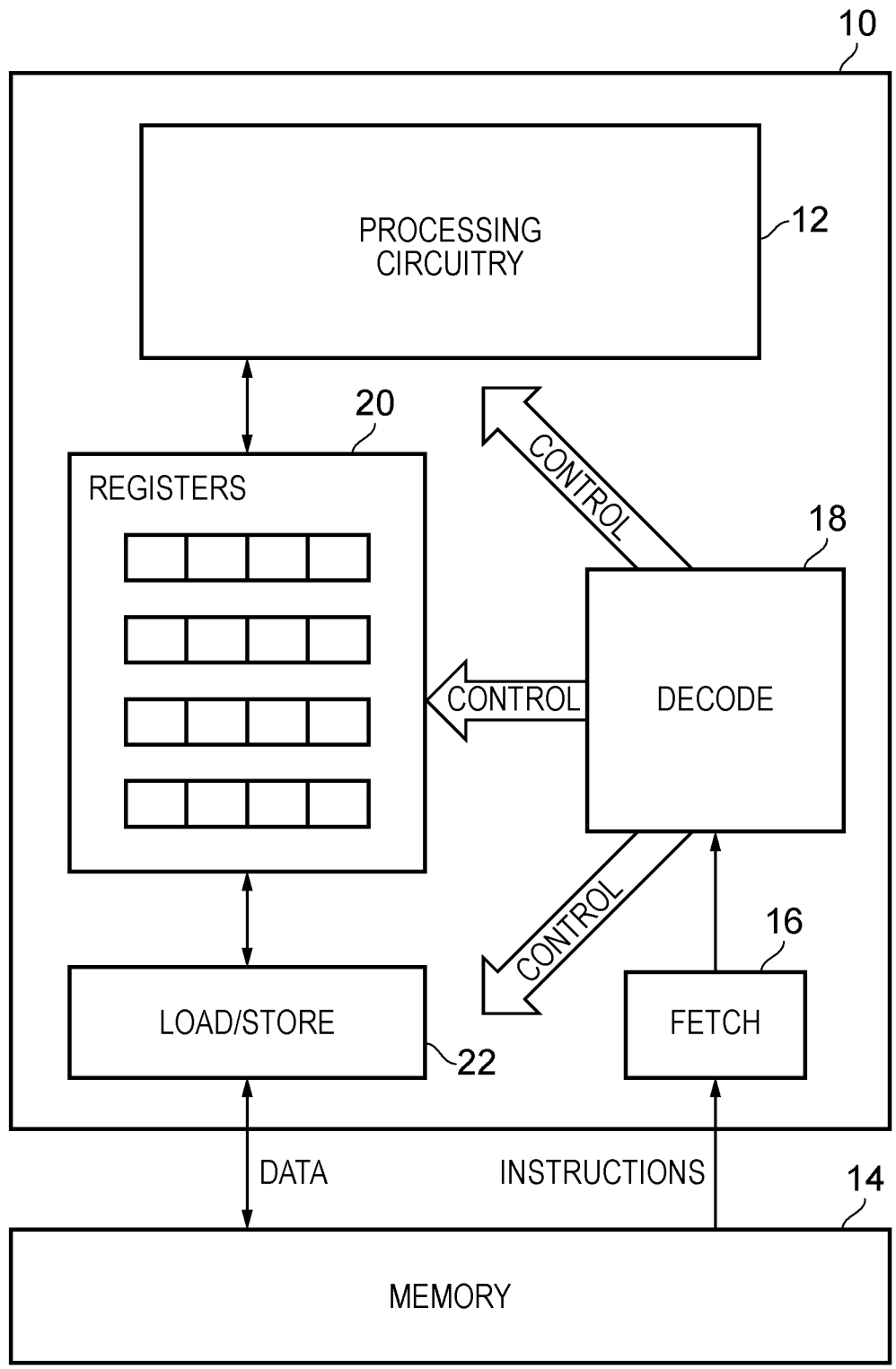

FIG. 1 schematically illustrates a data processing apparatus 10 which may embody various examples of the present techniques. The apparatus comprises data processing circuitry 12 which performs data processing operations on data items in response to a sequence of instructions which it executes. These instructions are retrieved from the memory 14 to which the data processing apparatus has access and, in a manner with which one of ordinary skill in the art will be familiar, fetch circuitry 16 is provided for this purpose. Furthermore, instructions retrieved by the fetch circuitry 16 are passed to the instruction decoder circuitry 18, which generates control signals which are arranged to control various aspects of the configuration and operation of the processing circuitry 12, as well as of a set of registers 20 and a load/store unit 22. Generally, the data processing circuitry 12 may be arranged in a pipelined fashion, yet the specifics thereof are not relevant to the present techniques. One of ordinary skill in the art will be familiar with the general configuration which FIG. 1 represents and further detailed description thereof is dispensed herewith merely for the purposes of brevity. The registers 20, as can be seen in FIG. 1, each comprise storage for multiple data elements, such that the processing circuitry can apply data processing operations either to a specified data element within a specified register, or can apply data processing operations to a specified group of data elements (a "vector") within a specified register. In particular the illustrated data processing apparatus is concerned with the performance of vectorised data processing operations, and specifically to the execution of complex number processing instructions, with respect to data elements held in the registers 20, further explanation of which will follow in more detail below with reference to some specific embodiments. Data values required by the data processing circuitry 12 in the execution of the instructions, and data values generated as a result of those data processing instructions, are written to and read from the memory 14 by means of the load/store unit 22. Note also that generally the memory 14 in FIG. 1 can be seen as an example of a computer-readable storage medium on which the instructions of the present techniques can be stored, typically as part of a predefined sequence of instructions (a "program"), which the processing circuitry then executes. The processing circuitry may however access such a program from a variety of different sources, such in RAM, in ROM, via a network interface, and so on. The present disclosure describes various novel instructions which the processing circuitry 12 can execute and the figures which follow provide further explanation of the nature of these instructions, variations in the data processing circuitry in order to support the execution of those instructions, and so on.

Figure 2:
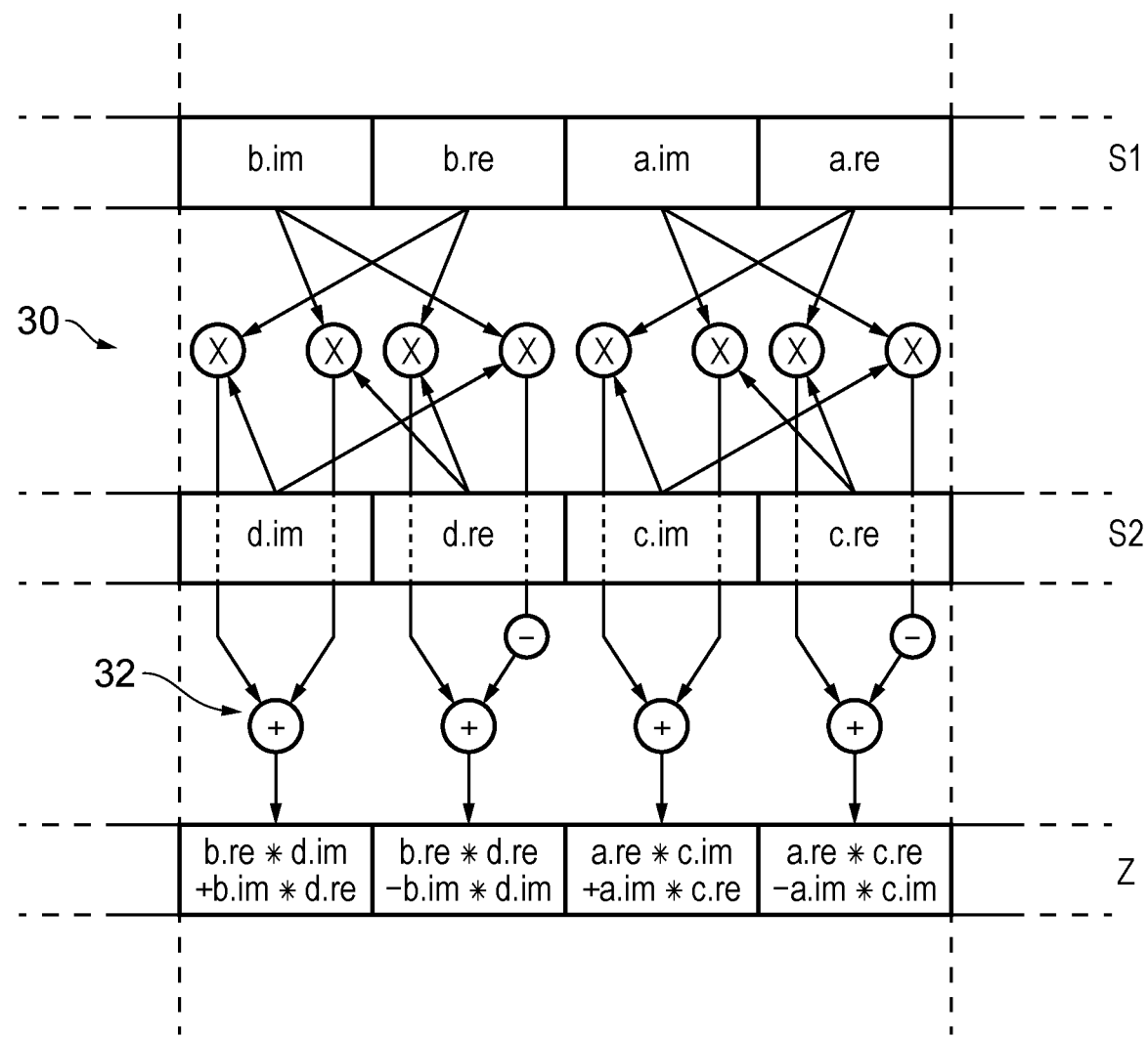

FIG. 2 schematically illustrates data processing circuitry in order to support a complex multiply instruction in one embodiment. As can be seen at the lower part of the figure, the complex multiply instruction CMUL specifies a first source register S1, a second source register S2 and a destination register Z. Moreover, in this embodiment the complex multiply instruction further specifies a data size of the complex number components involved, namely with the additional specification of the ".s" indicating that these are 32-bit values. In response to this instruction (or as will be appreciated from the above description of FIG. 1 strictly speaking in response to control signals generated by the decode circuitry 18 in response to the instruction) the data processing circuitry extracts a set of real complex number components and a set of imaginary complex number components from both the first source register S1 and the second source register S2, each of these components being a 32-bit value. As can be seen by the example components labelling the content of the source registers S1 and S2 in FIG. 2, the content of each source register is a sequence of complex number component pairs, i.e. real and imaginary components. This structure of the data in the source registers is useful in that the complex numbers are stored together, both here in the registers and in the memory location from which they were loaded, meaning that complexities associated with loading and de-interleaving operations to load separate real and imaginary components from memory are not necessary.

Further, the provision of the instruction illustrated and the data processing circuitry to support it means that the interleaved real and imaginary components in each source register can be directly processed, making possible the use of contiguous load and store instructions to bring these sets of values into the registers and to return them to memory, adding to the ease of implementation and supporting improved performance. In the specific example illustrated in FIG. 2, of a complex multiply instruction, a set of multiplication units 30 are shown which receive respective pairs of inputs from the first and second source register. It should be noted that although in the figure only a set of four components in each source register and in the destination register are shown and explicitly labelled, the present techniques provide that this processing may be replicated across the full width of a vector register (as indicated by the dashed lines to the left and right of the figure). The result of the multiplication operations performed by the multiply units 30 provides paired inputs to the addition units 32, noting that in two instances one of the inputs for the addition units is negated before being applied to the addition unit (i.e. to implement a subtraction). The result of the addition units 32 is then stored in the respective positions in the result register Z. In this example, where 32-bit values are specified, the set of result values generated by the addition unit 32 are each 32-bit values.

An example set of instructions provided by the present techniques, to which the CMUL instruction of FIG. 2 belongs, which are non-widening instructions are:
CMUL: complex multiply with rotation;
CMLA: complex multiply accumulate with rotation;
SQRDCMULH: signed saturating rounding doubling complex multiply with rotation, returning high half; and
SQRDCMLAH: signed saturating rounding doubling complex multiply-accumulate with rotation, returning high half.

Figure 3:
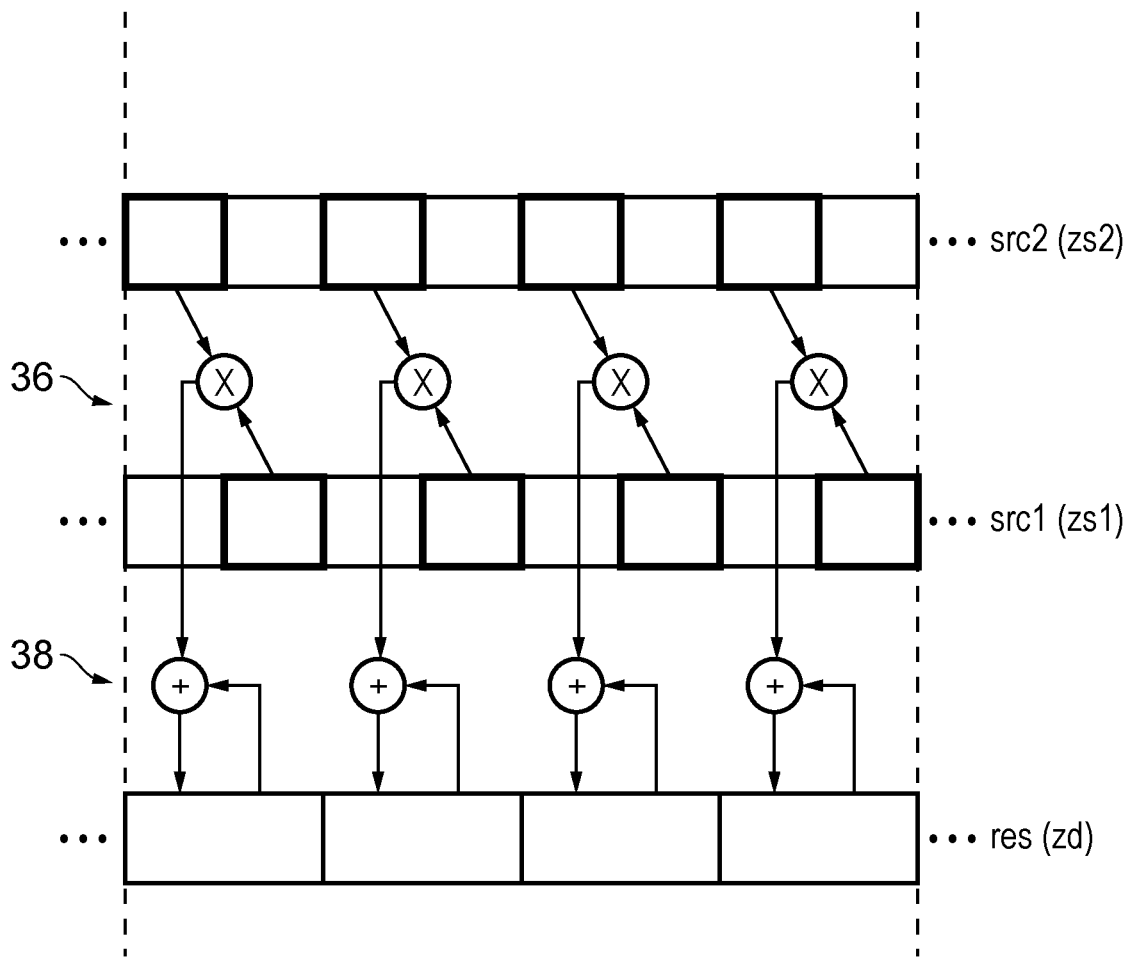

FIG. 3 schematically illustrates another complex number processing instruction in one embodiment, illustrating some notable differences to the example of FIG. 2. In this example, the instruction nomenclature SQDMLALBT corresponds to "signed doubling multiply add long bottom top". As can be seen in FIG. 3 with respect to the data processing circuitry provided to support this instruction, a set of four multiplication units 36 receive inputs from a first and second source register, where the instruction has again specified ("s") that a set of "single" 32-bit values should be extracted from each. Note that the "bottom top" feature of this instruction indicates that the lower half of pairs of components are to be extracted from the first source register zs1 and the upper half of the pair of components is to be extracted from the second source register zs2. The result of the multiplication operation between these pairs it extracts one input to the set of addition units 38, which add this set of values to values extracted from the destination register zd, i.e. this is an accumulation operation. Further, note that the instruction specifies the size of the components in the destination register as "d", i.e. 64-bit values. In other words, this operation is a widening operation. As a result of the illustrated instruction a set of imaginary components of the result of the multiplication between the set of complex numbers in the source register zs1 and the source register zs2 is generated and accumulated in the destination register zd, allowing for the widening of the result components with respect to the input components, such that precision is preserved. As in the case of FIG. 2, although in the figure only a set of four components is explicitly shown being extracted from each source register and accumulated in the destination register, the present techniques provide that this processing may be replicated across the full width of a vector register (as indicated by the dashed lines and ellipses to the left and right of the figure).

An example set of instructions provided by the present techniques, to which the SQDMLALBT instruction of FIG. 3 belongs, which are widening instructions which specify add/subtract bottom/top bottom/top (where bottom and top refer to the lower and upper halves of the complex numbers accessed, i.e. the real and imaginary parts of each complex number) are:
SQDMLALB: signed multiply add long bottom bottom;
SQDMLSLB: signed multiply subtract long bottom bottom;
SQDMLALT: signed multiply add long top top;
SQDMLSLT: signed multiply subtract long top top;
SQDMLALBT: signed multiply add long bottom top; and
SQDMLSLBT: signed multiply subtract long bottom top.

Noting that these are all "MLA" (multiply add—aka multiply accumulate) instructions, "MUL" versions are also provided (i.e. pure multiply versions), e.g. for use at the first iteration of an accumulation process where any pre-existing content of the destination register should not be accumulated. For these the "MLA" in the above list need just be replaced by "MUL".

Figure 4:
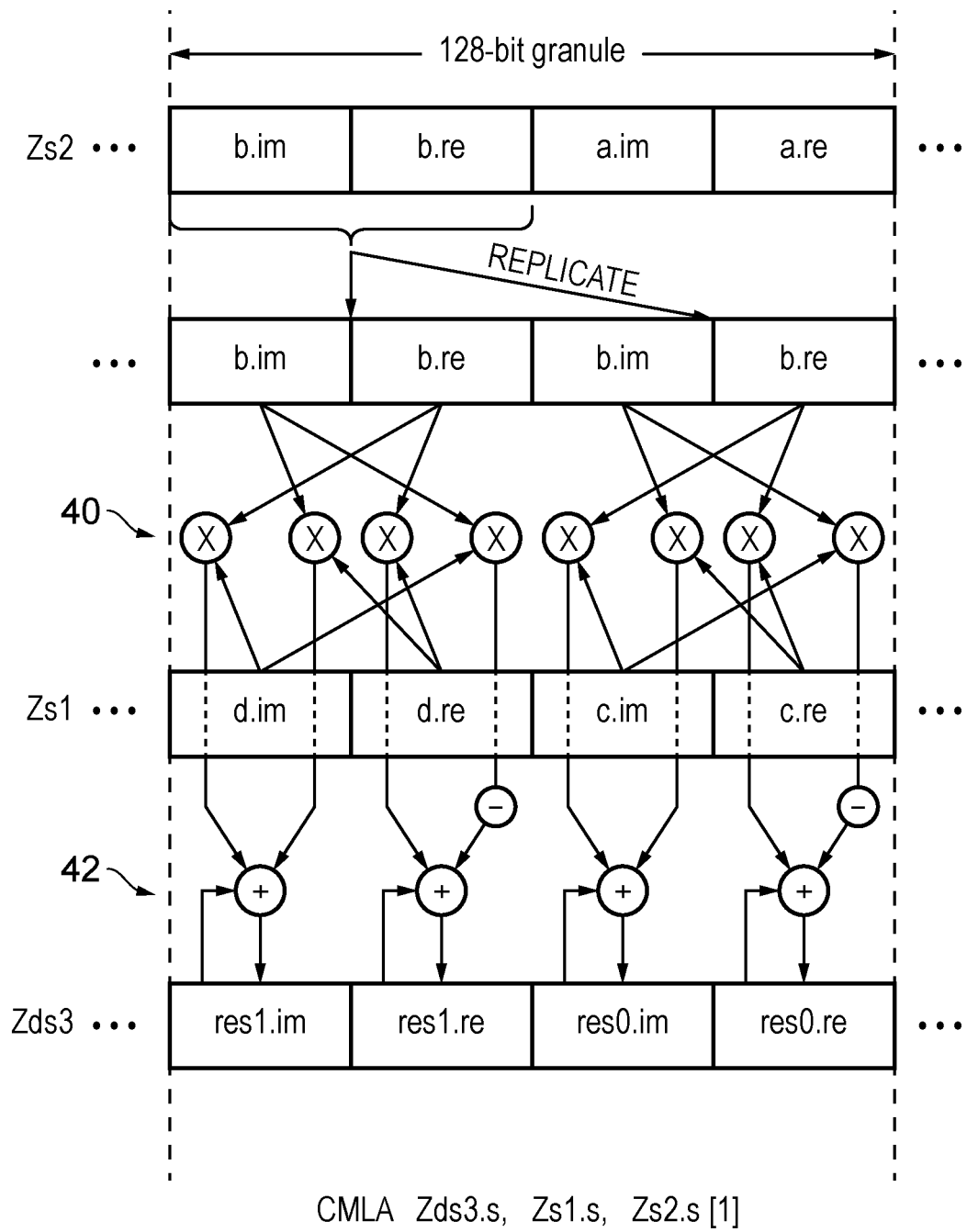

FIG. 4 schematically illustrates data processing circuitry in one embodiment provided to support another example instruction according to the present techniques, namely a complex multiply accumulate instruction. Of particular note in FIG. 4 is the additional specification of a replication index ("[1]") for the second source register zs2. Where, as shown in the figure, the vectorised nature of the supported processing is applied in 128-bit granules, i.e. the illustrated processing is repeated in these 128-bit granules across the width of the vector registers, and where the instruction specifies that the input component size is single, i.e. 32-bit, the specification of the replication index as "1" indicates that the complex number represented by the pair of 32-bit values in the upper half of the 128-bit granule should be replicated into the lower half. Note that in other examples, e.g. if the instruction were to specify "half" (i.e. 16-bit) values within the same 128-bit granules, the content of the granule would then represent twice as many complex numbers, i.e. there would be eight 16-bit values, and this replication index would cause the second (of four) complex numbers in that set to be replicated into the other three. However, considering the specific examples shown in FIG. 4, following the replication the components extracted from the first and second source registers provide pairs of inputs to the multiplication units 40 which in fact may be the same multiplication units as the units 30 shown in FIG. 2. Similarly the result of pairs of multiplication units 40 provide the inputs to the addition units 42. As in the case of FIG. 2 note that two of the addition units 42 have one of their inputs negated, but by contrast to the example of FIG. 2 the instruction in the example of FIG. 4 is an accumulate operation, so the existing content of the respective components held in the destination register provide an additional input to the addition units 42. The result value thus generated forms the new content of the respective components of the destination register zds3. Note that this is not a widening instruction, i.e. the result components are the same size as the input components, and thus the content of the destination register following the action of this instruction is a set of interleaved real and imaginary components of a set of complex numbers, i.e. in the same format that the two source registers have. As in the case of FIGS. 2 and 3, although in the figure only a set of four components is explicitly shown being extracted from each source register and accumulated in the destination register, the present techniques provide that this processing may be replicated across the full width of a vector register (as indicated by the dashed lines and ellipses to the left and right of the figure).

Figure 6:
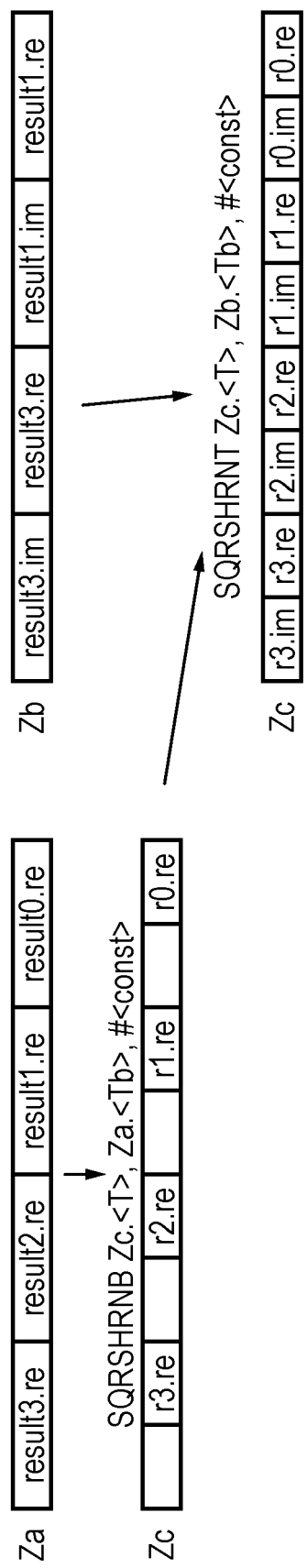
FIG. 6 illustrates the use of narrowing shift operations following the use of complex number instructions such as those shown in FIG. 5 to generate a final set of vectorised complex numbers.

FIG. 5 illustrates the operation of a further set of instructions in some embodiments. These can all be seen to be widening instructions which generate a set of either consecutive real complex number components (in the example of the first instructions) or a set of consecutive imaginary components (in the example of the third and fourth instructions shown). Note also that each instruction specifies a size of the data element to be processed and of the result data elements generated, as was described above for FIGS. 2-4, although here the specific sizes are left generic in the figures, e.g. <Zda>.<T> and <Zn><Tb>. It can be seen that in the notation of FIG. 5 at the end of the processing the produced real and imaginary results have been de-interleaved and destination register Zda contains all real results and Zdb contains all the imaginary results. Turning to FIG. 6, a narrowing shift operation can then be used to reorder the data from registers Za and Zb in order to produce the illustrated result set of complex number components in destination register Zc, where these are in the consecutive complex number format of the original source registers Zn and Zm (FIG. 5) and thus no further rearranging of the data is required. This set of result complex numbers can thus be stored back to memory in a contiguous store operation. As in the case of previous figures, although in FIGS. 5 and 6 only a set of four components is explicitly shown being extracted from each source register and accumulated in the destination register, the present techniques provide that this processing may be replicated across the full width of a vector register.

An example program sequence of instructions (1) making use of these multiply add/subtract bottom/top bottom/top instructions could for example be:
Example code sequence (1):

```
...
.Loop:
    ...
    LD1<Tb> <Zn>.<Tb>, <Pn>/z, [<Xn>]
    LD1<Tb> <Zm>.<Tb>, p/z, [<Xm>]
    SQDMLALB <Zda>.<T>, <Zn>.<Tb>, <Zm>.<Tb>
    SQDMLSLT <Zda>.<T>, <Zn>.<Tb>, <Zm>.<Tb>
    SQDMLALTB <Zdb>.<T>, <Zn>.<Tb>, <Zm>.<Tb>
    SQDMLALTB <Zdb>.<T>, <Zm>.<Tb>, <Zn>.<Tb>
    ...
.endLoop:
    SQSHRNB <Zda>.<Tb>, <Zda>.<T>, <imm>
    SQSHRNT <Zda>.<Tb>, <Zdb>.<T>, <imm>
    ST1 <Zda>.<Tb>, <Pd>, [Xd]
...
```

As well as the above mentioned multiply instructions, the present techniques also provide various complex dot product instructions, some of which are shown in the example embodiments of FIGS. 7A-7B, together with the data processing circuitry provided to support them. In a first approach to supporting such complex dot product operations, the real and imaginary parts of the result values are computed separately, as FIGS. 7A-7D illustrate. Accordingly, this allows the set of instruction shown to produce a widening effect on the result data, which can be seen in the examples of FIGS. 7A-7D to expand the data precision by a factor of four, i.e. where the input complex number components (real and imaginary) are each 16-bit values, whilst the result value is a 64-bit value. The dot product units 50 each calculate a partial product from a respective set of four input components from respective real and imaginary components of a pair of complex numbers taken from each source register. Note that in some instances (labelled "−1") a given input is negated. The partial products thus generated are accumulated by the addition circuitry 52. As also illustrated in these figures, these operations are accumulation operations where the existing content of the respective portion of the destination register forms a further input to the addition units which generate the final result. Accordingly in brief summary of the operations shown in FIG. 7A-7D, CDOTRE accumulates the real part of two complex multiplications, CDOTIM accumulates the imaginary part of two complex multiplications, CCDOTRE accumulates the real part of two complex conjugate multiplications, and CCDOTIM accumulates the imaginary part of two complex conjugate multiplications.

Following the use of two of these instructions (in dependence on whether a "regular" complex multiplication is being performed or a complex conjugate multiplication), in order to get back to the initial data precision a sequence of operations can be executed such as that shown in FIG. 8. As can be seen the real and imaginary components in the registers Za, Zb, Zc and Zd are subjected to a narrowing shift operation in order to interleave the two sets of respective real and imaginary components into destination registers Ze and Zf, and then a further narrowing shift operation is performed to reduce the component size further (and back to that of the original source registers), and to interleave the real and imaginary components to give final complex number results in one register. As in the case of previous figures, the circuitry and processing explicitly shown in FIGS. 7A-7D and 8 can be replicated across the full width of a vector register.

A benefit of the present techniques may be appreciated by consideration of the two following example code sequences (2) and (3), which represent a prior art implementation of such complex dot product processing compared with the approach taken in according to the present techniques using instructions such as those illustrated in FIGS. 7A-7D. It can be seen that the CDOT instructions of the present techniques allow a significant improvement (2×) of the compute throughput of the data processing circuitry, whilst increasing the accumulation headroom (64-bit accumulator for 16-bit inputs i.e. 4×).

Example prior art code sequence (ARM® NEON™ implementation of a complex dot product) (2):

```
...
.Loop:
    ...
    // load 8 complex values from a and b
    ld2 {v0.8h, v1.8h}, [aPtr], #32
    ld2 {v2.8h, v3.8h}, [bPtr], #32
    smlal v4.4s, v0.4h, v2.4h  // c.re += a.re * b.re
    smlal v5.4s, v1.4h, v2.4h  // c.im += a.im * b.re
    smlsl v4.4s, v1.4h, v3.4h  // c.re -= a.re * b.im
    smlal v5.4s, v0.4h, v3.4h  // c.im += a.re * b.im
    smlal2 v6.4s, v0.8h, v2.8h  // c.re += a.re * b.re
    smlal2 v7.4s, v1.8h, v2.8h  // c.im += a.im * b.re
    smlsl2 v6.4s, v1.8h, v3.8h  // c.re -= a.re * b.im
    smlal2 v7.4s, v0.8h, v3.8h  // c.im += a.re * b.im
    ...
.endLoop:
    ...
    add v4.4s, v4.4s, v6.4s
    add v5.4s, v5.4s, v7.4s
    addv s4, v4.4s  // horizontal accumulation for the real
```

```
        addv s5, v5.4s // horizontal accumulation for the imaginary
        sqshrn h4, s4, #16 // Right shift by 16 for the real
        sqshrn h5, s5, #16 // Right shift by 16 for the imaginary
        st2 {v4.h, v5.h}[0], [outPtr]// store the output
```

Example code sequence according to the present techniques (for a complex dot product using CDOT) (3):

```
    ...
    .Loop:
    ...
    // load 8 complex values from a and b
    ld1h z0.h, <Pn>/z, [aPtr, #0]
    ld1h z2.h, <Pn>/z, [aPtr, #16]
    ld1h z1.h, <Pn>/z, [bPtr, #0]
    ld1h z3.h, <Pn>/z, [bPtr, #16]
    cdotre z4.d, z0.h, z1.h // c.re += a.re * b.re
    cdotim z5.d, z0.h, z1.h // c.im += a.im * b.re
    cdotre z6.d, z2.h, z3.h // c.re += a.re * b.re
    cdotim z7.d, z2.h, z3.h // c.im += a.im * b.re
    ...
    .endLoop:
    ...
    sqrshrnb z8.s,z4.d, #16
    sqrshrnb z8.s,z6.d, #16
    sqrshrnb z9.s,z5.d, #16
    sqrshrnb z9.s,z7.d, #16
    sqrshrnb z10.h,z8.s, #16
    sqrshrnb z10.h,z9.s, #16
    rev z11.h, <Pm>/m, z10.h
    uzip1 z12.s, <Pm>/m, z11.s
    str s12, [cPtr]
    ...
```

An alternative approach to supporting complex dot product operations is also provided by the present techniques and is now discussed with reference to FIGS. 9A-9D and FIG. 10. Here, by contrast to the above discussed complex dot product instructions, the data expansion is only 2×, and as can be seen in the examples of FIGS. 9A-9D, the result of the dot product instructions is still interleaved (i.e. alternating real and imaginary components) in the result register. In this approach, as can be seen in FIGS. 9A-9D, the initial set of operations on the extracted components from the respective source registers is only a multiplication operation, performed by the multiplication units 54. As in the example of FIGS. 7A-7D, note that certain inputs are negated. Note also that in the example of FIGS. 9A-9D only one instruction is defined, namely SQRDCDOT, but the four different responses to this instruction shown in the four examples result from the use of an additional parameter in the instruction (i.e. #0, #90, #180, and #270) which represents a transposition, i.e. indicating a particular manner of combining the respective real and imaginary components of each source register. These are colloquially referred to herein as a "rotation", by analogy with the rotation of a complex number in the complex plane, although it is important to appreciate that the transpositions which are performed generally do not strictly correspond to a rotation in the complex plane. This may be understood further with reference to FIG. 12, in which the corresponding usage of the components taken from the first and second source registers for the four different values of the "rotation value", where it can be seen that the transpositions used for the second source register do in fact correspond to a rotation in the complex plane of the represented complex number by a rotation in degrees given by the rotation parameter value, however this is not the case for the transpositions applied in the case of the first source register, and hence the comment that generally these transpositions are not strictly a rotation in the complex plane. The results of the multiplication units 54 provide the pairs of first inputs to the accumulation (addition) units 56 shown in FIGS. 9A-9D, with the existing content of the respective portion of the destination register providing a further input (i.e. for accumulation). Although both real and imaginary components are therefore generated according to this approach to producing the complex dot product result, nevertheless this is still a widening operation with the real and imaginary components generated being twice the size of the real and imaginary input components. As in the first approach described above, the use of the instruction of the SQRDCDOT instructions of FIGS. 9A-9D can then be followed by a pair of narrowing shift operations to bring the data back to the initial data precision and to interleave the real and imaginary results in one destination register with the real and imaginary components in another destination register to produce a single set of complex number components, with interleaved real and imaginary components forming complex number values, in a single destination register, as can be seen in FIG. 10. As in the case of previous figures, the circuitry and processing explicitly shown in FIGS. 9A-9D and 10 can be replicated across the full width of a vector register.

The above-mentioned "rotation value" may also be usefully applied to many of the other complex number processing instructions described herein, as is now described. For example, the complex addition instructions can rotate the complex numbers in the second source vector by 90 degrees or 270 degrees, when considered in polar representation, before adding pairs of elements to the corresponding elements of the first source vector in a destructive manner.

The complex multiply-add instructions perform a transformation of the operands to allow the creation of a multiply-add operation on complex numbers by combining two of the instructions. The transformations performed are as follows: (1) The complex numbers in the second source vector, considered in polar form, are rotated by 0 degrees or 180 degrees before multiplying the duplicated real components of the first source vector. (2) The complex numbers in the second source vector, considered in polar form, are rotated by 90 degrees or 270 degrees before multiplying by the duplicated imaginary components of the first source vector. The resulting products are then added to the corresponding components of the destination and addend vector. Using these transformations, two instructions can then be combined advantageously. For example, if we consider the following sequence:

SQRDCMLAH Zda.S, Zn.S, Zm.S, #A
SQRDCMLAH Zda.S, Zn.S, Zm.S, #B

Then meaningful combinations of A and B are:

A=0, B=90. In this case, the two vectors of complex numbers in Zn and Zm are multiplied and the products are added to the complex numbers in Zda.

A=0, B=270. In this case, the conjugates of the complex numbers in Zn are multiplied by the complex numbers in Zm and the products are added to the complex numbers in Zda.

A=180, B=270. In this case, the two vectors of complex numbers in Zn and Zm are multiplied and the products are subtracted from the complex numbers in Zda.

A=180, B=90. In this case, the conjugates of the complex numbers in Zn are multiplied by the complex numbers in Zm and the products are subtracted from the complex numbers in Zda.

As described above, the widening complex fixed-point instructions de-interleave the real and imaginary components of complex values while processing them in order to generate components of the complex result which are of a higher numeric precision than the input values (i.e. they are "widening"). Thus, these instructions are notably different from other complex instructions which process the real and imaginary components of each complex number together such that both components of the complex result are written to adjacent elements in the destination. The following instructions are useful when generating the widened components of the result of the complex multiply-add:

SQDMLALBT: widened imaginary values;
SQDMLSLT: widened real values;
SQDMLALB: widened conjugate real values; and
SQDMLSLBT: widened conjugate imaginary values.

The fixed-point complex dot product instructions delimit the source vectors into pairs of, say, 8-bit or 16-bit signed integer complex numbers. Within each pair, the complex values in the first source vector are multiplied by the corresponding complex values in the second source vector and the resulting widened products are summed and added to, say, the 32-bit or 64-bit element of the accumulator which overlaps the pair of complex numbers in the first source vector.

These instructions de-interleave the complex values in addition to providing the basic dot product functionality. Therefore, the source vectors contain interleaved real and imaginary components of complex numbers, but the destination vector holds an exclusive set of either wide real or wide imaginary components. Using the rotation values for these instructions:

If the rotation is 0, the result will be a vector containing the real components of the complex dot product operation.

If the rotation is 90, the result will be a vector containing the imaginary components of the complex dot product operation.

If the rotation is 180, the result will be a vector containing the real components of the complex conjugate dot product operation.

If the rotation is 270, the result will be a vector containing the imaginary components of the complex conjugate dot product operation.

The signed/unsigned integer complex dot product instruction delimits the source vectors into pairs of, say, 8-bit or 16-bit signed/unsigned integer complex numbers. Within each pair, the complex values in the first source vector are multiplied by the corresponding complex values in the second source vector and the resulting widened products are summed and added to the, say, 32-bit or 64-bit element of the accumulator (destination element) which aligns with the pair of complex numbers in the first source vector.

The values read from the multiplicand source vectors are transformed based on the rotation parameter before the multiplication step is performed. None, one, or both of the parts of the source complex numbers are permuted and/or negated depending on the immediate rotation value. Using the rotation values for these instructions:

If the rotation is 0, the odd-numbered components of the complex numbers from the second source are negated and the destination vector contains the real components of the complex dot product operation.

If the rotation is 90, the real and imaginary parts of the complex numbers from the second source are swapped and the destination vector contains the imaginary components of the complex dot product operation.

If the rotation is 180, there is no transformation applied and the destination vector contains the real components of the complex conjugate dot product operation.

If the rotation is 270, the even-numbered components of the complex numbers from the second source are negated, then the real and imaginary parts of the resulting vector derived from the second source are swapped, and the destination vector contains the imaginary components of the complex conjugate dot product operation.

In some embodiments the complex number operation may be a variety of complex addition (i.e. including complex subtraction) and the data processing circuitry to support some of these is schematically illustrated in FIGS. 11A and 11B. Once more the "rotation value" mentioned above is made use of, with a value of #90 being used in the example of FIG. 11A and the value of #270 being used in the example of FIG. 11B. Note that as shown in the figures these rotation values (being a set of four) are in fact proposed to be represented by a 2-bit value, where in these examples 00 corresponds to #90 and 01 corresponds to #270.

The examples shown in FIGS. 11A and 11B are representative of the data processing circuitry provided to support complex addition instructions, which in one example instruction set are defined as either SQCADD or UQADD (that is, signed or unsigned variants of the saturating complex addition instruction), where saturating means that a result value in each component of the result will not wrap around, but rather will saturate at a predetermined maximum value. Thus the addition units 60 take inputs from the respective real and imaginary components of the input source registers and (noting that some inputs are negated) sum these to produce the real and imaginary components which are interleaved in the destination register. Using different values of the rotation parameter, all required permutations of combination of the real and imaginary components of the complex numbers in the first and second source registers can be achieved. As in the case of previous figures, the circuitry and processing explicitly shown in FIGS. 11A and 11B can be replicated across the full width of a vector register.

In further examples, SUBLTB and ADDLBT instructions operate on interleaved real and imaginary components, and are widening instructions. These instructions are useful when generating the widened components of the result of the complex addition (X+jY) or (X−jY), given complex numbers X and Y:

ADDLBT: widened imaginary values when computing (X+jY)
SUBLBT: widened real values when computing (X+jY)
SUBLTB: widened imaginary values when computing (X−jY)
ADDLBT: widened real values when computing (X−jY)

FIG. 13 shows a sequence of steps which are taken when performing the method of one embodiment. The flow can be considered to begin at step 100, where the next instruction in a sequence of instructions received is decoded. It is then determined at step 102 if this is a complex number instruction of the present techniques. If it is not then the flow proceeds via step 104 where these instructions are processed as appropriate, this not being the concern of the present disclosure. The flow then returns to step 100 to decode the next instruction. However, when this is a complex number instruction the flow proceeds to step 106 where, depending on the particular type of complex number instruction encountered, real and/or imaginary components are extracted from the first source register and at step 108 real and/or imaginary components are extracted from the second source register. It should be noted that the extractions of steps 106 and 108 will typically be performed in parallel, which is merely described in this sequential fashion in FIG. 13 for clarity. Then at step 110 a complex number operation is performed using these extracted components. Step 112 determines if this is an interleaved result or not. When it is then the flow proceeds via step 114, where real and imaginary result components are interleaved in their application to the destination register, and when it is not this flow proceeds via step 116, where an interleaved result then either a set of real result components or a set of imaginary result components are applied to the specified destination register. By which ever route, the flow then returns to step 100 for the next instruction to be decoded.

FIG. 14 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 which is the same as the application program interface of the hardware architecture being modelled by the simulator program 710. Thus, the program instructions of the target code 700, including the complex number processing instructions described above, may be executed from within the instruction execution environment using the simulator program 710, so that a host computer 730 which does not actually have the hardware features of the apparatus discussed above can emulate these features.

In brief overall summary apparatuses, methods, programs, and complex number processing instructions are provided to support vector processing operations on input data vectors comprising a plurality of input data items at respective positions in the input data vectors. In response to the instructions at least one first set of data items is extracted from alternating positions in a first source register and at least one second set of data items is extracted from alternating positions in the second source register, wherein consecutive data items in the first and second source registers comprise alternating real and imaginary components of respective sets of complex numbers. A result set of complex number components is generated using the two sets of data items as operands, and the result set of complex number components is one of a real part and an imaginary part of a complex number result of the complex number operation applied to the two sets of complex numbers. The result set of complex number components is applied to the destination register.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Apparatus comprising:
instruction decoder circuitry to decode instructions; and
data processing circuitry to selectively apply vector processing operations specified by the instructions to input data vectors comprising a plurality of input data items at respective positions in the input data vectors,
wherein the instruction decoder circuitry is responsive to a complex number processing instruction specifying a complex number operation, a first source register, a second source register, and a destination register to generate control signals to control the data processing circuitry to:
extract at least one first set of data items from alternating positions in the first source register, wherein consecutive data items in the first source register comprise alternating real and imaginary components of a first set of complex numbers;
extract at least one second set of data items from alternating positions in the second source register, wherein consecutive data items in the second source register comprise alternating real and imaginary components of a second set of complex numbers;

generate a result set of complex number components using the first and second sets of data items as operands, wherein the result set of complex number components is one of:

a set of real components of a complex number result of the complex number operation applied to the first set of complex numbers and the second set of complex numbers, each of the set of complex number components having zero imaginary component; and a set of imaginary components of a complex number result of the complex number operation applied to the first set of complex numbers and the second set of complex numbers, each of the set of complex number components having zero real component; and apply the result set of complex number components to the destination register, wherein the data processing circuitry is responsive to the control signals to apply the result set of complex number components in consecutive positions in the destination register, and wherein the complex number processing instruction further specifies a replication index for at least one of the first source register and the second source register, and wherein the data processing circuitry is further responsive to the control signals to replicate a source set of complex numbers in the at least one of the first source register and the second source register, the replication index specifying which components of the first source register and the second source register comprise the source set of complex numbers.

2. The apparatus as claimed in claim 1, wherein each complex number component of the result set of complex number components is wider than each data item of the first and second sets of data items.

3. The apparatus as claimed in claim 1, wherein the complex number processing instruction further specifies whether the first set of data items is to be extracted from odd-numbered positions or even-numbered positions in the first source register, and wherein the complex number processing instruction further specifies whether the second set of data items is to be extracted from odd-numbered positions or even-numbered positions in the second source register.

4. The apparatus as claimed in claim 1, wherein replication of the source set of complex numbers comprises more than single replication of the source set of complex numbers.

5. The apparatus as claimed in claim 1, wherein the at least one first set of data items extracted from the first source register comprises the first set of data items and a third set of data items, wherein when the first set of data items is real components of the first set of complex numbers the third set of data items is imaginary components of the first set of complex numbers, and when the first set of data items is imaginary components of the first set of complex numbers the third set of data items is real components of the first set of complex numbers, and wherein the data processing circuitry is further responsive to the control signals to generate the result set of complex number components further using the third set of data items as operands.

6. The apparatus as claimed in claim 1, wherein the at least one second set of data items extracted from the second source register comprises the second set of data items and a fourth set of data items, wherein when the second set of data items is real components of the second set of complex numbers the fourth set of data items is imaginary components of the second set of complex numbers, and when the second set of data items is imaginary components of the second set of complex numbers the fourth set of data items is real components of the second set of complex numbers, and wherein the data processing circuitry is further responsive to the control signals to generate the result set of complex number components further using the fourth set of data items as operands.

7. The apparatus as claimed in claim 5, wherein the complex number operation is a complex dot product operation, and wherein the data processing circuitry comprises accumulation circuitry responsive to the control signals to accumulate the result set of complex number components from partial products of a set of pairs of real and imaginary component pairs of the first set of complex numbers and a set of pairs of real and imaginary component pairs of the second set of complex numbers.

8. The apparatus as claimed in claim 1, wherein the complex number operation comprises a complex multiply operation.

9. The apparatus as claimed in claim 1, wherein the complex number operation is a complex addition operation or a complex subtraction operation.

10. The apparatus as claimed in claim 1, wherein the complex number processing instruction further specifies a transposition parameter, and the data processing circuitry is responsive to the control signals to apply a transposition operation on at least one of the first and second sets of complex numbers prior to application of the complex number operation to the first and second sets of complex numbers.

11. The apparatus as claimed in claim 10, wherein the transposition operation comprises at least one of:

substitution of real with imaginary components;
substitution of imaginary with real components;
exchange of real and imaginary components;
negation of real components; and
negation of imaginary components
in at least one the first set of complex numbers and the second set of complex numbers.

12. The apparatus as claimed in claim 10, wherein the complex number processing instruction specifies the transposition parameter as an immediate value.

13. A method of operating a data processing apparatus comprising the steps of:

decoding instructions;

selectively applying vector processing operations specified by the instructions to input data vectors comprising a plurality of input data items at respective positions in the input data vectors;

generating control signals in response to a complex number processing instruction specifying a complex number operation, a first source register, a second source register, and a destination register to control data processing circuitry of the data processing apparatus to:

extract at least one first set of data items from alternating positions in the first source register, wherein consecutive data items in the first source register comprise alternating real and imaginary components of a first set of complex numbers;

extract at least one second set of data items from alternating positions in the second source register, wherein consecutive data items in the second source register comprise alternating real and imaginary components of a second set of complex numbers;

generate a result set of complex number components using the first and second sets of data items as operands, wherein the result set of complex number components is one of a set of real components of a complex number result of the complex number operation applied to the first set of complex numbers and the second set of complex numbers, each of the set of complex number components having zero imaginary component; and a set of imaginary components of a complex number result of the complex number operation applied to the first set of complex numbers and the second set of complex numbers, each of the set of complex number components having zero real component; and apply the result set of complex number components to the destination register, wherein the result set of complex number components is applied in consecutive positions in the destination register, and wherein the complex number processing instruction further specifies a replication index for at least one of the first source register and the second source register, and wherein the method further comprises, in response to the control signals, replicating a source set of complex numbers in the at least one of the first source register and the second source register, the replication index specifying which components of the first source register and the second source register comprise the source set of complex numbers.

14. A computer program stored on a non-transitory computer readable storage medium for controlling a host data processing apparatus to provide an instruction execution environment comprising:

instruction decoding program logic to decode instructions; and data processing program logic to selectively apply vector processing operations specified by the instructions to input data vector structures comprising a plurality of input data items at respective positions in the input data vector structures, wherein the instruction decoding program logic is responsive to a complex number processing instruction specifying a complex number operation, a first source data structure, a second source data structure, and a destination data structure to generate control signals to control the data processing program logic to:

extract at least one first set of data items from alternating positions in the first source data structure, wherein consecutive data items in the first source data structure comprise alternating real and imaginary components of a first set of complex numbers;

extract at least one second set of data items from alternating positions in the second source data structure, wherein consecutive data items in the second source data structure comprise alternating real and imaginary components of a second set of complex numbers;

generate a result set of complex number components using the first and second sets of data items as operands, wherein the result set of complex number components is one of-:

a set of real components of a complex number result of the complex number operation applied to the first set of complex numbers and the second set of complex numbers, each of the set of complex number components having zero imaginary component; and a set of imaginary components of a complex number result of the complex number operation applied to the first set of complex numbers and the second set of complex numbers, each of the set of complex number components having zero real component; and apply the result set of complex number components to the destination data structure, wherein the result set of complex number components is applied in consecutive positions in the destination data structure, and wherein the complex number processing instruction further specifies a replication index for at least one of the first source register and the second source register, and wherein the data processing program logic is further responsive to the control signals to replicate a source set of complex numbers in the at least one of the first source register and the second source register, the replication index specifying which components of the first source register and the second source register comprise the source set of complex numbers.

* * * * *